US012804417B2

(12) United States Patent
Bai et al.

(10) Patent No.: US 12,804,417 B2
(45) Date of Patent: Nov. 17, 2026

(54) SIGNAL SENDING METHOD, TARGET SENSING METHOD, DEVICE AND STORAGE MEDIUM

(71) Applicant: DATANG MOBILE COMMUNICATIONS EQUIPMENT CO., LTD., Beijing (CN)

(72) Inventors: Wei Bai, Beijing (CN); Qiusha Gong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 654 days.

(21) Appl. No.: 18/255,350

(22) PCT Filed: Nov. 26, 2021

(86) PCT No.: PCT/CN2021/133503
§ 371 (c)(1),
(2) Date: May 31, 2023

(87) PCT Pub. No.: WO2022/135026
PCT Pub. Date: Jun. 30, 2022

(65) Prior Publication Data
US 2024/0022922 A1 Jan. 18, 2024

(30) Foreign Application Priority Data
Dec. 25, 2020 (CN) ......................... 202011558992.1

(51) Int. Cl.
*H04W 16/28* (2009.01)
*G01S 7/00* (2006.01)
(Continued)

(52) U.S. Cl.
CPC ............. *H04W 16/28* (2013.01); *G01S 7/006* (2013.01); *G01S 13/46* (2013.01); *G01S 13/86* (2013.01); *G01S 2013/464* (2013.01)

(58) Field of Classification Search
CPC ........ H04W 16/28; G01S 7/006; G01S 13/46; G01S 13/86; G01S 2013/464; H04B 7/04013; H04B 7/06952
See application file for complete search history.

(56) References Cited

U.S. PATENT DOCUMENTS 7,463,185 B2 * 12/2008 Nakanishi ................. G01S 3/20 342/158
8,195,258 B2 * 6/2012 Lennartson .......... H01Q 3/2605 455/25
(Continued)

FOREIGN PATENT DOCUMENTS

CN 107656275 A 2/2018
CN 109507757 A 3/2019
(Continued)

OTHER PUBLICATIONS

Partial Supplementary European Search Report for European Patent Application No. 21909025.5 issued by the European Patent Office on May 14, 2024.
(Continued)

*Primary Examiner* — Timothy A Brainard
*Assistant Examiner* — Bongani Jabulani Mashele
(74) *Attorney, Agent, or Firm* — Ladas & Parry, LLP

(57) ABSTRACT

The present disclosure discloses a signal sending method, a target sensing method, a device and a storage medium. The method includes: switching, by a first device, a main lobe direction of a transmission beam from a first direction to a second direction, and sending a sensing signal; wherein, the second direction is a direction that the main lobe direction of the transmission beam of the first device is aligned with the
(Continued)

second device, the first direction is different from the second direction; after sending the sensing signal, switching, by the first device, the main lobe direction of the transmission beam from the second direction to the first direction or a third direction, and the third direction is different from the second direction.

17 Claims, 4 Drawing Sheets

(51) Int. Cl.
*G01S 13/46* (2006.01)
*G01S 13/86* (2006.01)

(56) References Cited

U.S. PATENT DOCUMENTS

| | | | |
|---|---|---|---|
| 10,834,613 | B1 | 11/2020 | Tsai et al. |
| 2003/0017853 | A1 | 1/2003 | Kanamaluru et al. |
| 2017/0302338 | A1 | 10/2017 | Lyu |
| 2018/0031694 | A1 | 2/2018 | Kuo |
| 2018/0034529 | A1* | 2/2018 | Hessler .................. H04B 7/024 |
| 2018/0241494 | A1 | 8/2018 | Chendamarai Kannan et al. |
| 2020/0015228 | A1* | 1/2020 | Kang .................... H04W 24/10 |
| 2020/0322812 | A1 | 10/2020 | Shi et al. |
| 2021/0247498 | A1 | 8/2021 | Shi et al. |
| 2021/0384961 | A1* | 12/2021 | Park ......................... H04B 7/10 |

FOREIGN PATENT DOCUMENTS

| | | | |
|---|---|---|---|
| CN | 111381239 | A | 7/2020 |
| CN | 111742572 | A | 10/2020 |
| CN | 111866726 | A | 10/2020 |
| WO | 2016106620 | A1 | 7/2016 |
| WO | 2020186097 | A1 | 9/2020 |

OTHER PUBLICATIONS

International Search Report for PCT/CN2021/133503 issued on Feb. 16, 2022 and its English Translation provided by WIPO.
Written Opinion for PCT/CN2021/133503 issued on Feb. 16, 2022 and its English Translation provided by WIPO.
International Preliminary Report on Patentibily for PCT/CN2021/133503 issued on Jun. 13, 2023 and its English translation provided by WIPO.
First Chinese Office Action and search report for Chinese Patent Application No. 202011558992.1 issued by the Chinese Patent Office on Jul. 7, 2023 and its English translation provided by the global dossier.

* cited by examiner

SIGNAL SENDING METHOD, TARGET SENSING METHOD, DEVICE AND STORAGE MEDIUM

CROSS-REFERENCE TO RELATED APPLICATIONS

This application is the U.S. national phase of PCT Application No. PCT/CN2021/133503 filed on Nov. 26, 2021, which claims priority to the Chinese patent application No. 202011558992.1 filed on Dec. 25, 2020, the disclosures of which are incorporated herein by reference in their entireties.

TECHNICAL FIELD

The present disclosure relates to the field of communication and radar technology, in particular to a signal sending method, a target sensing method, a device and a storage medium.

BACKGROUND

With the development of communication and radar technology, there are more and more applications for sensing targets through signals sent by devices, such as millimeter-wave synthetic aperture radar (SAR) imaging technology. However, at present, the sensing signal is sent mainly by increasing the isolation of the sending and receiving antenna of the sensing signal sending device, and increasing the isolation of the sending and receiving antenna often leads to an increase in the size of the device.

SUMMARY

The present disclosure aims to provide a signal sending method, a target sensing method, a device and a storage medium, so as to solve the problem that the size of the device is increased.

An embodiment of the present disclosure provides a signal sending method, including: switching, by a first device, a main lobe direction of a transmission beam from a first direction to a second direction, and sending a sensing signal; wherein, the second direction is a direction that the main lobe direction of the transmission beam of the first device is aligned with the second device, the first direction is different from the second direction; after sending the sensing signal, switching, by the first device, the main lobe direction of the transmission beam from the second direction to the first direction or a third direction, and the third direction is different from the second direction.

Optionally, when the main lobe direction of the transmission beam is the second direction, a received signal strength of the second device is higher than a received signal strength of the second device in at least one first state, the main lobe direction of the transmission beam of the second device in the first state is a direction other than the second direction, and the received signal strength of the second device is a received signal strength of the second device with respect to the first device.

Optionally, when the main lobe direction of the transmission beam is the first direction or the third direction, the received signal strength of the second device is lower than a received signal strength of the second device in at least one second state, the main lobe direction of the transmission beam of the second device in the second state is a direction other than the first direction or the third direction, and the received signal strength of the second device is the received signal strength of the second device with respect to the first device.

Optionally, the second device comprises: a target or a reflective device; wherein the reflective device has an ability to reflect a signal and an ability to receive a signal.

Optionally, the method further includes: sending, by the first device, configuration information to the second device, wherein the configuration information includes at least one of the following: a transmission resource location of the sensing signal, waveform information of the sensing signal, configuration information of the second device, or configuration information for the second device to feedback sensing information.

An embodiment of the present disclosure provides a target sensing method, including: receiving, by a second device, a sensing signal sent by a first device; wherein, the sensing signal is a sensing signal sent by the first device by switching a main lobe direction of a transmission beam from a first direction to a second direction; wherein, the second direction is a direction that the main lobe direction of the transmission beam of the first device is aligned with the second device, the first direction is different from the second direction.

Optionally, the method further includes: reflecting, by the second device, the sensing signal; receiving, by the second device, an echo signal generated by a target; detecting, by the second device, the target according to the sensing signal received by the second device and the echo signal received by the second device.

Optionally, the detecting, by the second device, the target according to the sensing signal received by the second device and the echo signal received by the second device, includes: detecting, by the second device, the target according to the sensing signal received by the second device, the echo signal received by the second device, and a reflection coefficient of the second device.

Optionally, the detecting, by the second device, the target according to the sensing signal received by the second device, the echo signal received by the second device, and a reflection coefficient of the second device, includes: calculating, by the second device, a receiving and sending response of the second device according to a first reception variable, a second reception variable, and the reflection coefficient of the second device, and calculating the sensing information of the target based on the receiving and sending response, and detecting the target according to the sensing information of the target; wherein the first reception variable is a reception variable that the second device receives the sensing signal, and the second reception variable is a reception variable that the second device receives the echo signal.

Optionally, the method further includes: receiving, by the second device, configuration information sent by the first device, wherein the configuration information includes at least one of the following: a time-frequency resource position of the sensing signal, waveform information of the sensing signal, configuration information of the second device, and configuration information for the second device to feedback the sensing information.

An embodiment of the present disclosure provides a device, being a first device, including: a memory, a transceiver, and a processor, wherein: the memory is used to store computer programs; the transceiver is used to send and receive data under the control of the processor; the processor is used to read the computer programs in the memory and perform the following operations: switching a main lobe direction of a transmission beam from a first direction to a second direction, and sending a sensing signal; wherein, the second direction is a direction that the main lobe direction of the transmission beam of the first device is aligned with the second device, the first direction is different from the second direction; after sending the sensing signal, switching the main lobe direction of the transmission beam from the second direction to the first direction or a third direction, and the third direction is different from the second direction.

Optionally, when the main lobe direction of the transmission beam is the second direction, a received signal strength of the second device is higher than a received signal strength of the second device in at least one first state, the main lobe direction of the transmission beam of the second device in the first state is a direction other than the second direction, and the received signal strength of the second device is a received signal strength of the second device with respect to the first device.

Optionally, when the main lobe direction of the transmission beam is the first direction or the third direction, the received signal strength of the second device is lower than a received signal strength of the second device in at least one second state, the main lobe direction of the transmission beam of the second device in the second state is a direction other than the first direction or the third direction, and the received signal strength of the second device is the received signal strength of the second device with respect to the first device.

An embodiment of the present disclosure provides a device, being a second device, including: a memory, a transceiver, and a processor, wherein: the memory is used to store computer programs; the transceiver is used to send and receive data under the control of the processor; the processor is used to read the computer programs in the memory and perform the following operations: receiving a sensing signal sent by a first device; wherein, the sensing signal is a sensing signal sent by the first device by switching a main lobe direction of a transmission beam from a first direction to a second direction; wherein, the second direction is a direction that the main lobe direction of the transmission beam of the first device is aligned with the second device, the first direction is different from the second direction.

Optionally, the processor is further configured to: reflect the sensing signal; receive an echo signal generated by a target; detect the target according to the sensing signal received by the second device and the echo signal received by the second device.

An embodiment of the present disclosure provides a device, being a first device, including: a first sending unit, configured to switch a main lobe direction of a transmission beam from a first direction to a second direction, and send a sensing signal; wherein, the second direction is a direction that the main lobe direction of the transmission beam of the first device is aligned with the second device, the first direction is different from the second direction; a switching unit, configured to, after sending the sensing signal, switch the main lobe direction of the transmission beam from the second direction to the first direction or a third direction, and the third direction being different from the second direction.

Optionally, when the main lobe direction of the transmission beam is the second direction, a received signal strength of the second device is higher than a received signal strength of the second device in at least one first state, the main lobe direction of the transmission beam of the second device in the first state is a direction other than the second direction, and the received signal strength of the second device is a received signal strength of the second device with respect to the first device.

Optionally, when the main lobe direction of the transmission beam is the first direction or the third direction, the received signal strength of the second device is lower than a received signal strength of the second device in at least one second state, the main lobe direction of the transmission beam of the second device in the second state is a direction other than the first direction or the third direction, and the received signal strength of the second device is the received signal strength of the second device with respect to the first device.

An embodiment of the present disclosure provides a device, being a second device, including: a first receiving unit, configured to receive a sensing signal sent by a first device; wherein, the sensing signal is a sensing signal sent by the first device by switching a main lobe direction of a transmission beam from a first direction to a second direction; wherein, the second direction is a direction that the main lobe direction of the transmission beam of the first device is aligned with the second device, the first direction is different from the second direction.

Optionally, the device further includes: a reflection unit, configured to reflect the sensing signal; a second receiving unit, configured to receive an echo signal generated by a target; a detection unit, configured to detect the target according to the sensing signal received by the second device and the echo signal received by the second device.

An embodiment of the present disclosure provides a processor-readable storage medium, wherein the processor-readable storage medium stores a computer program, and the computer program is executed by the processor to implement the signal sending method, or, the computer program is executed by the processor to implement the target sensing method.

In the embodiment of the present disclosure, the first device switches the main lobe direction of the transmission beam from the first direction to the second direction, and sends a sensing signal; wherein, the second direction is a direction that the main lobe direction of the transmission beam of the first device is aligned with the second device, the first direction is different from the second direction; after sending the sensing signal, the first device switches the main lobe direction of the transmission beam from the second direction to the first direction or the third direction, the third direction is different from the second direction. Since the sensing signal is sent by switching the main lobe direction, there is no need to increase the isolation of the receiving and transmitting antenna to avoid increasing the size of the device.

DETAILED DESCRIPTION

In order to make the technical problems, technical solutions and advantages to be solved by the present disclosure clearer, the following will describe in detail with reference to the drawings and specific embodiments.

The term "and/or" in the embodiments of the present disclosure describes the association relationship of associated objects, indicating that there may be three relationships, for example, A and/or B, which may mean: A exists alone, A and B exist simultaneously, and B exists alone. The character "/" generally indicates that the contextual objects are an "or" relationship.

The term "plurality" in the embodiments of the present disclosure refers to two or more, and other quantifiers are similar.

The following will clearly and completely describe the technical solutions in the embodiments of the present disclosure with reference to the accompanying drawings. Obviously, the described embodiments are only some of the embodiments of the present application, not all of them. Based on the embodiments in the present disclosure, all other embodiments obtained by persons of ordinary skill in the art without making creative efforts belong to the scope of protection of the present disclosure.

Embodiments of the present disclosure provide a signal sending method, a target sending method, a device, and a storage medium, so as to solve the problem that the size of the device is increased.

The method and the device are conceived based on the same disclosure. Since the method and the device have similar problem-solving principles, the implementation of the device and the method can be referred to each other, and the repetition will not be repeated.

The technical solutions provided by the embodiments of the present disclosure may be applicable to various systems, especially 6G systems. For example, the applicable system may be global system of mobile communication (GSM) system, code division multiple access (CDMA) system, wideband code division multiple access (WCDMA) general packet Wireless service (GPRS) system, long term evolution (LTE) system, LTE frequency division duplex (FDD) system, LTE time division duplex (TDD) system, Long term evolution advanced (LTE-A) system, universal mobile telecommunications system (UMTS), worldwide interoperability for microwave access (WiMAX) system, 5G new radio (NR) system, 6G system, etc. These various systems include terminal devices and network devices. The system may also include a core network, such as an evolved packet system (EPS), a 5G system (5GS), and the like.

Figure 1:
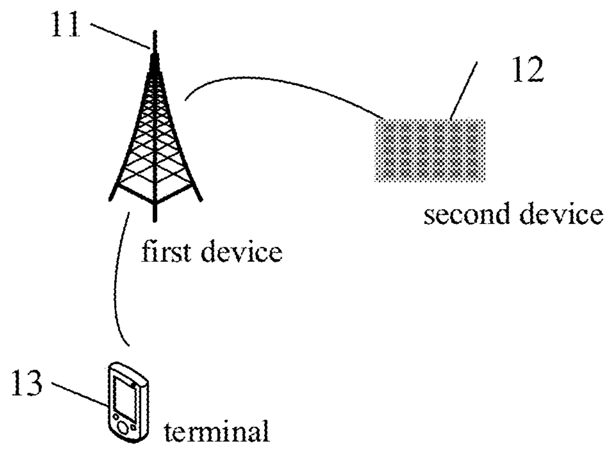
FIG. 1 is a schematic structural diagram of a network architecture according to an embodiment of the present disclosure.
Figure 2:
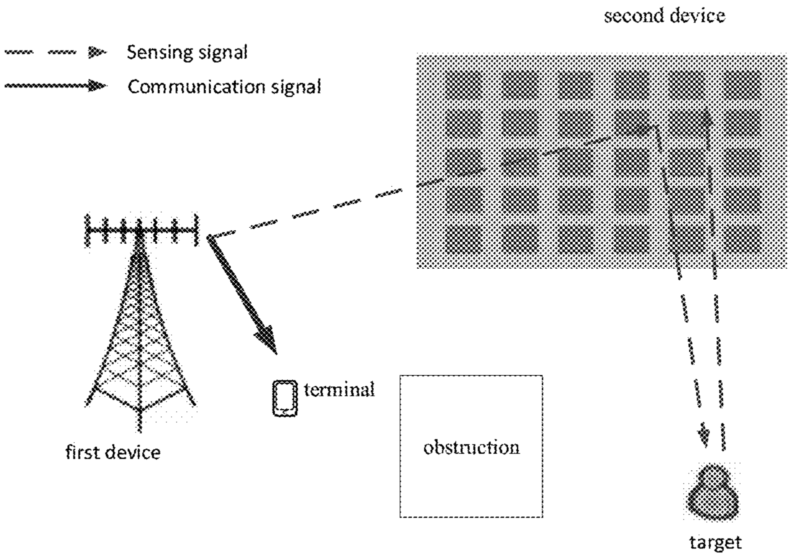
FIG. 2 is a schematic diagram of an application scenario according to an embodiment of the present disclosure.

FIG. 1 is a schematic structural diagram of an applicable network architecture according to an embodiment of the present disclosure. As shown in FIG. 1, the first device 11 and the second device 12 are included. The first device may be a network device, the second device 12 may be a target or a reflective device. Further, the above network framework also includes a terminal 13, or, in the case that the second device 12 is the reflective device, the network framework also includes a target as shown in FIG. 2, and the target may be called a target object.

Wherein, the terminal involved in the embodiments of the present disclosure may be a device that provides voice and/or data connectivity to users, a handheld device with a wireless connection function, or other processing devices connected to a wireless modem. In different systems, the name of the terminal equipment may be different. For example, in a 5G system, the terminal equipment may be called user equipment (UE). Wireless terminal equipment can communicate with one or more core networks (CN) via a radio access network (RAN). The wireless terminal equipment can be a mobile terminal equipment, such as a mobile phone (or called a "cellular" telephones) and computers with mobile terminal equipment, such as portable, pocket, handheld, computer built-in or vehicle-mounted mobile devices, which exchange voice and/or data with the radio access network. For example, Personal Communication Service (PCS) phones, cordless phones, Session Initiated Protocol (SIP) phones, Wireless Local Loop (WLL) stations, Personal Digital Assistant (PDA), Redcap terminal and other devices. Wireless terminal equipment can also be called system, subscriber unit, subscriber station, mobile station, mobile station, remote station, access point, a remote terminal, an access terminal, a user terminal, a user agent, and a user device, which are not limited in the embodiments of the present disclosure.

The network device involved in the embodiments of the present disclosure may be a base station, and the base station may include multiple cells that provide services for terminals. Depending on the specific application, the base station can also be called an access point, or it can be a device in the access network that communicates with the wireless terminal device through one or more sectors on the air interface, or other names. Network devices can be used to interchange received over-the-air frames with Internet Protocol (IP) packets and act as routers between wireless terminal devices and the rest of the access network, which can include the IP communication network. Network devices may also coordinate attribute management for the air interface. For example, the network device involved in this embodiment of the present disclosure may be a network device (Base Transceiver Station, BTS) in Global System for Mobile communications (GSM) or Code Division Multiple Access (CDMA), or a network device (NodeB) in Wide-band Code Division Multiple Access (WCDMA), or an evolved network device (evolutional Node B, eNB or e-NodeB) in a long term evolution (LTE) system, 5G base station (gNB) in the 5G network architecture (next generation system), a base station in 6G, or Home evolved Node B (HeNB), a relay node, a home base station (femto), a pico base station (pico), etc. which are not limited in this embodiment of the present disclosure. In some network structures, a network device may include a centralized unit (CU) node and a distributed unit (DU) node, and the centralized unit and the distributed unit may also be arranged geographically separately.

One or more antennas can be used between network devices and terminals for Multi Input Multi Output (MIMO) transmission. MIMO transmission can be Single User MIMO (SU-MIMO) or Multi-User MIMO (MU-MIMO). According to the shape and number of root antenna combinations, MIMO transmission can be 2D-MIMO, 3D-MIMO, FD-MIMO, or massive-MIMO, or diversity transmission, precoding transmission, or beamforming transmission, etc.

In the embodiment of the present disclosure, the target may be an object that needs to be sensed, such as: a person, a vehicle and other objects, and as shown in FIG. 2, in some scenarios, there is an obstruction between the target and the first device 11 or there is no obstruction therebetween.

In the embodiments of the present disclosure, the reflective device may be an electronic device capable of reflecting signals and receiving signals, for example, electronic devices such as large-scale antenna arrays or smart metasurfaces.

Figure 3:
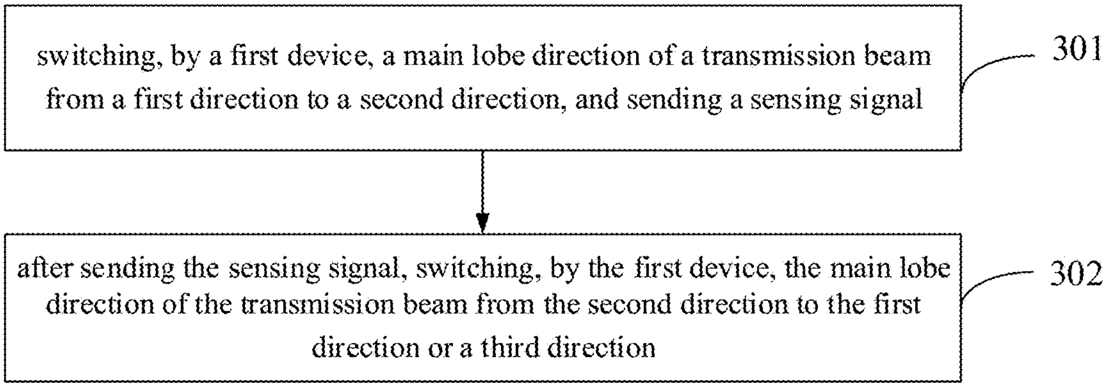
FIG. 3 is a flow chart of a signal sending method according to an embodiment of the present disclosure.

FIG. 3 is a flow chart of a signal sending method according to an embodiment of the present disclosure. As shown in FIG. 3, it includes the following steps:

Step 301, switching, by a first device, a main lobe direction of a transmission beam from a first direction to a second direction, and sending a sensing signal; wherein, the second direction is a direction that the main lobe direction of the transmission beam of the first device is aligned with the second device, the first direction is different from the second direction;

Step 302: After sending the sensing signal, switching, by the first device, the main lobe direction of the transmission beam from the second direction to the first direction or a third direction, and the third direction is different from the second direction.

The switching of the main lobe direction of the transmission beam by the first device from the first direction to the second direction may be to switch the main lobe direction of the transmission beam from the first direction to the second direction when the sensing signal needs to be sent, that is, the main lobe direction of the transmission beam is aligned with the second device to send the sensing signal. The first direction is different from the second direction, so that the main lobe direction of the transmission beam is not aligned with the second device before switching to the second direction, for example: as shown in FIG. 2, the communication signal is sent by aligning the terminal, that is, the communication signal is sent by avoiding the second device.

After sending the sensing signal, the first device switches the main lobe direction of the transmission beam from the second direction to the first direction or the third direction. Also, since the third direction is different from the second direction, after the sensing signal is sent, the main lobe direction of the transmission beam is not aligned with the second device, that is, the second device is avoided. Through the above steps, it can be realized that the main lobe direction of the transmission beam is not aligned with the second device before and after sending the sensing signal, so that the first device can send other signals during this period without increasing the isolation of the transmitting and receiving antennas, so as to avoid increasing the size of the device, for example, as shown in FIG. 2, the first device sends a communication signal to the terminal during this period. In addition, during the period when no sensing signal is sent, it can also be avoided that the signal sent by the transmission beam affects the second device, so as to improve the accuracy of the second device to sense the target.

Figure 4:
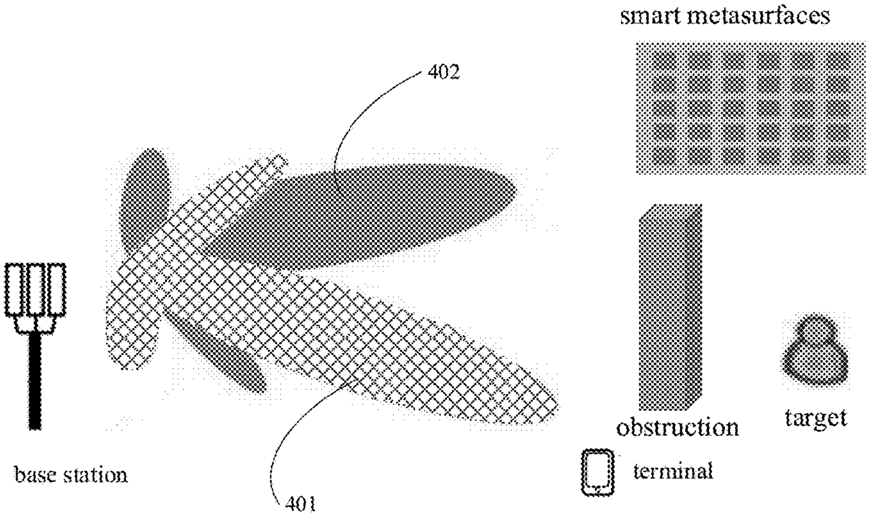
FIG. 4 is a schematic diagram of a signal transmission according to an embodiment of the present disclosure.

Take the second device as an example of a smart metasurface, as shown in FIG. 4, the second direction can be the beam direction 402 as shown in FIG. 4, and the first direction or the third direction can be the beam direction 401 as shown in FIG. 4.

In the embodiment of the present disclosure, the transmission beam may be a digital beam, the embodiment of the present disclosure is not limited to the digital beam, and may also be other beams capable of switching beam directions. In addition, beamforming can be used to switch the main lobe direction of the transmission beam.

As an optional implementation, when the main lobe direction of the transmission beam is the second direction, the received signal strength of the second device is higher than a received signal strength of the second device in at least one first state, the main lobe direction of the transmission beam of the second device in the first state is a direction other than the second direction, and the received signal strength of the second device is the received signal strength of the second device with respect to the first device.

The at least one first state may be any state except that the main lobe direction of the transmission beam is the second direction, so that when the main lobe direction of the transmission beam is the second direction, the signal received by the second device from the first device has largest received signal strength, that is, which is greater than the received signal strength of the signal received by the second device from the first device when the main lobe direction of the transmission beam is any other direction, so as to improve the sensing effect of the second device on the target. Or the first state may be a partial state except that the main lobe direction of the transmission beam is the second direction, so that when the main lobe direction of the transmission beam is the second direction, the received signal strength of the signal received by the second device from the first device is second to the largest received signal strength or relative large.

In this embodiment, since the received signal strength of the second device when the main lobe direction of the transmission beam is the second direction is higher than the received signal strength of the second device in at least one first state, thereby improving the sensing effect of the second device on the target.

As an optional implementation, when the main lobe direction of the transmission beam is the first direction or the third direction, the received signal strength of the second device is lower than the received signal strength of the second device in at least one second state, the main lobe direction of the transmission beam of the second device in the second state is a direction other than the first direction or the third direction, and the received signal strength of the second device is the received signal strength of the second device with respect to the first device.

The at least one first state can be any state except that the main lobe direction of the transmission beam is the first direction or the third direction, so that when the main lobe direction of the transmission beam is the first direction or the third direction, the received signal strength of a signal received by the second device from the first device is the smallest, that is, smaller than the received signal strength of the signal received by the second device from the first device when the main lobe direction of the transmission beam is in any other direction. The first state may be a partial state except that the main lobe direction of the transmission beam is the first direction or the third direction, and it may be realized that when the main lobe direction of the transmission beam is the first direction or the third direction, the received signal strength of the second device from the first device is the second to the smallest one or relatively small.

In this implementation, since the received signal strength of the second device when the main lobe direction of the transmission beam is the first direction or the third direction is lower than that of the second device in at least one second state, so as not to affect the sensing of second device on the target.

In some implementation, when the main lobe direction of the transmission beam is the second direction, the main lobe direction of the beam transmitted by the first device is aligned with the second device. When the main lobe direction of the transmission beam is the first direction or the third direction, the main lobe direction of the beam transmitted by the first device is not aligned with the second device, and the side lobe direction is also not aligned with the second device. By selecting the direction of the transmission beam of the first device, the received signal strength of the signal received by the second device from the first device is minimized to avoid affecting the sensing of second device on the target.

As an optional embodiment, the second device includes:

A target or a reflective device;

Wherein the reflective device has an ability to reflect a signal and an ability to receive a signal.

The targets can be objects that need to be sensed, such as people, vehicles, etc.

The reflective devices can be electronic devices with the ability to reflect signals and the ability to receive signals, such as large-scale antenna arrays or smart metasurfaces.

As an optional embodiment, the method further comprises:

Sending, by the first device, configuration information to the second device, wherein the configuration information includes at least one of the following:

a transmission resource location of the sensing signal, waveform information of the sensing signal, configuration information of the second device, configuration information for the second device to feedback sensing information.

Wherein the transmission resource location may include a time-frequency resource position, the waveform information of the sensing signal may include an angle of departure (AoD) of the sensing signal, the configuration information of the second device may include the behavior configuration information of the second device for target detection.

In some embodiments, the sensing signal may be specially designed so that the second device can detect the sensing signal relatively easily, e.g., a pseudo-random sequence. It should be noted that the sensing signal is not limited herein.

In some implementation, the power of the sensing signal sent by the first device may be a pre-power or a power defined in a protocol. Further, the power of the sensing signal sent by the first device can be set so that when the sensing signal is reflected by the second device and reflected by the target to reach the second device, the final receiving signal-to-noise ratio is greater than the preset threshold SNR0, which can improve the sensing effect of the second device.

In some embodiments, when the main lobe direction of the transmission beam is the second direction, or the first direction or the third direction, for example: the main lobe direction and the minimum power direction of the first device are respectively aligned with the second device. When the second device detects the sensing signal twice, each receiving signal-to-noise ratio is greater than the preset threshold SNR1, which can further improve the sensing effect of the second device.

In some implementation, the above method provided by the embodiments of the present disclosure may be applied to a macro cell or a micro cell, and there may be no obstruction between the first device and the target.

In the embodiment of the present disclosure, the first device switches the main lobe direction of the transmission beam from the first direction to the second direction, and sends a sensing signal; wherein, the second direction is a direction that the main lobe direction of the transmission beam of the first device is aligned with the second device, the first direction is different from the second direction; after sending the sensing signal, the first device switches the main lobe direction of the transmission beam from the second direction to the first direction or the third direction, the third direction is different from the second direction. Since the sensing signal is sent by switching the main lobe direction, there is no need to increase the isolation of the receiving and transmitting antenna to avoid increasing the size of the device.

Figure 5:
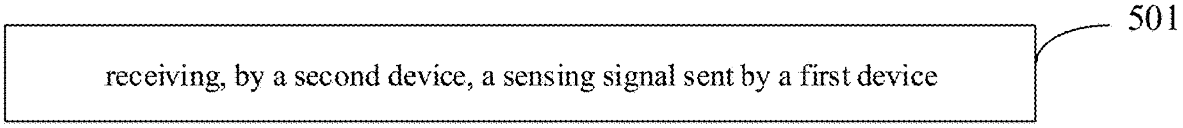
FIG. 5 is a flow chart of a target sensing method according to an embodiment of the present disclosure.

FIG. 5 is a flowchart of a target sensing method according to an embodiment of the present disclosure. As shown in FIG. 5, it includes the following steps:

Step 501, receiving, by a second device, a sensing signal sent by a first device;

Wherein, the sensing signal is a sensing signal sent by the first device by switching the main lobe direction of the transmission beam from a first direction to a second direction; wherein, the second direction is a direction that the main lobe direction of the transmission beam of the first device is aligned with the second device, the first direction is different from the second direction.

As an optional implementation, the method also includes:

Reflecting, by the second device, the sensing signal;

Receiving, by the second device, an echo signal generated by a target;

Detecting, by the second device, the target according to the sensing signal received by the second device and the echo signal received by the second device.

As shown in FIG. 4, after the second device receives the sensing signal sent by the first device, the second device reflects the sensing signal, and the target receives the reflected sensing signal and generates a corresponding echo signal, so the echo signal is received in step 503.

The detecting, by the second device, the target according to the sensing signal received by the second device and the echo signal received by the second device may be: detecting a position, a size, and an image of the target based on the received sensing signal and the echo signal. In addition, the detecting the target may also be referred to as sensing the target.

In this embodiment, the above steps can be used to realize the sensing of the characteristics of the target. Since the second device does not need to have the ability to actively send signals, it can realize the sensing of the target, thereby reducing the complexity of the second device.

As an optional implementation, the detecting, by the second device, the target according to the sensing signal received by the second device and the echo signal received by the second device, including:

Detecting, by the second device, the target according to the sensing signal received by the second device, the echo signal received by the second device, and a reflection coefficient of the second device.

Wherein, the reflective coefficient of the second device may be configured by the first device, or pre-configured by the second device.

In an implementation, the detecting, by the second device, the target according to the sensing signal received by the second device, the echo signal received by the second device, and a reflection coefficient of the second device, including:

Calculating, by the second device, a receiving and sending response of the second device according to a first reception variable, a second reception variable, and the reflection coefficient of the second device, and calculating the sensing information of the target based on the receiving and sending response, and detecting the target according to the sensing information of the target;

Wherein, the first reception variable is a reception variable that the second device receives the sensing signal, and the second reception variable is a reception variable that the second device receives the echo signal.

The first reception variable may be the electric field or power of the sensing signal received by the second device, and the second reception variable may be the electric field or power of the echo signal received by the second device. The electric field may be an electric field performing detection using a radio frequency baseband (RF-BB) link of the second device. In addition, by multiplying the electric field of the sensing signal received by the first device by the reflection coefficient of the antenna unit, the electrode field for the second device to transmit the sending signal at the antenna unit can be obtained.

The sensing information may be image information, shape information, or size information of target features, such as a 3D image of the target.

The receiving and sending response can be calculated by the following formula:

$$R(x,y,f)=Er(x,y)/Ei(x,y)/F(x,y)$$

Wherein, R(x, y, f)=represents the receiving and sending response, Ei(x, y) represents the electric field of the second device receiving the sensing signal, Er(x, y) represents the electric field of the second device receiving the echo signal, (x, y) represents the sensing unit (antenna unit or smart metasurface unit) that receives the sensing signal and echo signal, and Γ(x, y) is the reflection coefficient of the sensing unit (antenna unit or smart metasurface unit) whose coordinates are (x, y), where f is the carrier frequency of the sensing signal.

In one method, the second device may calculate the sensing information of the target based on the receiving and sending response by using a spatial Fourier transform method.

For example: the sensing information of the target is calculated by the following formula:

$$S(k_x, k_y, f) = \sum_x \sum_y R(x, y, f)e^{-jk_x x - jk_y y}$$

$$k_z = \sqrt{4k^2 - k_x - k_y}$$

$$F(k_x, k_y, k_z) = s(k_x, k_y, f)e^{-jk_x z_1}$$

$$f(x, y, z) = \sum_{k_x} \sum_{k_y} \sum_{k_z} F(k_x, k_y, k_z)e^{jk_x x + jk_y y + kjk_z z}$$

R(x, y, f) represents the receiving and sending response of the second device, and the frequency of the sensing signal at a point (x, y) on a plane of the second device is f; $S(k_x, k_y, f)$ represents the spatial Fourier transformation of the receiving and sending response, k is the wave number, $k_x$ is the wave number in the X direction, $k_y$ is the wave number in the Y direction, $k_z$ is the wave number in the Z direction; $Z_1$ is the Z-axis coordinate of the second device, and the second device is a plane at a fixed position perpendicular to the Z-axis; f(x,y,z) represents the sensing information of the target, for example: 3D image information.

It should be noted that the embodiments of the present disclosure do not limit the calculation of the sensing information by the above method, for example, the sensing information may also be determined according to the power of the echo signal received by the second device and the time delay of the echo signal.

In one method, the second device can calculate the sensing information of the target based on millimeter-wave time-delay spectrum TDS technology, for example: millimeter-wave time-delay spectrum TDS technology, TDS technology uses femtosecond laser technology to obtain broadband millimeter-wave pulses, which are divided by beam splitter into a pumping wave and a detection wave. The pumping wave is used to excite the millimeter-wave source, and the detection wave is used to drive the millimeter-wave detector. The millimeter-wave pulse generated by the millimeter-wave source is irradiated to the target, and the millimeter-wave detector receives the pulse signal reflected by the target, detects the millimeter-wave electric field intensity at the moment when the probe wave pulse arrives, obtains the change of the millimeter-wave electric field intensity with time by changing the time when the probe wave pulse reaches the millimeter-wave detector, and then the reflection spectrum is obtained through the time-domain Fourier transformation, which contains amplitude and phase information, so as to obtain the sensing information of the target.

It should be noted that the embodiment of the present disclosure does not limit the calculation method of calculating the sensing information of the target based on the sending and receiving response, for example: in addition to the above calculation method, it can also use the calculation method defined in the protocol or subsequently newly defined in the protocol.

As an optional implementation, the method also includes:

Receiving, by the second device, configuration information sent by the first device, wherein the configuration information includes at least one of the following:

a time-frequency resource position of the sensing signal, waveform information of the sensing signal, configuration information of the second device, and configuration information for the second device to feedback the sensing information.

It should be noted that this embodiment is an implementation of network device corresponding to the embodiment shown in FIG. 3, which may refer to the description of FIG. 3, the embodiment will not be repeated, and the same beneficial effect can also be achieved.

The method provided by the embodiment of the present disclosure is illustrated below:

EXAMPLE

The following steps may be included in this example:

Step 1. The first device sends the configuration information of the sensing signal to the second device, the configuration information include at least one of time-frequency resource location, angle of departure (AoD), waveform and other information.

Step 2. Before the first device sends the sensing signal, beamforming technology is used to align the minimum power direction of the transmitted signal with the second device, for example, the smallest direction in the direction drawing is aligned with the second device.

For example: the first device can switch the beam direction with time, and the time granularity of the baseband digital beamforming of the first device is nanosecond level or lower. For example, in a system with 1.5 GHZ bandwidth, 0.67 ns granularity is used to switch the direction of the digital beamforming. As shown in FIG. 4, the first device is using the beam direction shown in 401 to serve the terminal at the beginning, and communication signals are transmitted with the terminal, for example, the duration is 0-1 us (=1000n5).

Step 3. The first device uses the beamforming technology, and the main lobe direction of the signal is aligned with the second device, and a sensing signal is sent to the second device at the configured time-frequency resource position.

For example: as shown in FIG. 4, the first device switches to the beam direction shown in 402, and the beam direction is aligned with the center of the second device, so that the second device is used for sensing imaging and transmitting the sensing signal, for example, the duration is 1 us-1000.67 ns and in total 0.67 ns.

Step 4. The second device receives the sensing signal sent by the first device, and measures the electric field Ei(x, y) of the antenna unit (or smart metasurface unit) signal with coordinates (x, y) on the second device.

Step 5. After the first device has sent the sensing signal, the beamforming technology is used to align the direction of the minimum power of the transmitted signal with the second device, such as aligning the smallest direction in the direction drawing with the second device.

For example, as shown in FIG. 4, the first device switches to the beam direction shown in 401 to serve the terminal again, and transmits communication signals with the terminal. For example, the duration is 1000.67 ns-2000.67 ns.

Figure 6:
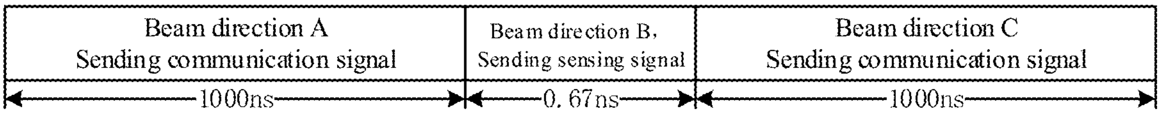
FIG. 6 is a schematic diagram of switching time of a beam sending direction according to an embodiment of the present disclosure.

Specifically, the time for the first device to switch the beam mode can be shown in FIG. 6. For example, beam direction A is used to send communication signals in 1000 ns, beam direction B is used to send sensing signals in 0.67 ns, and beam direction C is used to send sensing signals in another 1000 ns.

Step 6. The second device receives the sensing signal (i.e. echo signal) reflected by the target, and measures the electric field Er(x, y) of the antenna unit signal whose coordinates are (x, y) on the second device.

In this embodiment, in addition to controlling the reflected signal, the second device can also receive the signal, that is, receive two sensing signals at different times. One is that the second device will measure the target sensing signal after 1 us, which is the sensing signal sent by the first device to the second device. The sensing signal sent by the first device can reach the target after being reflected by the second device, and the target will generate the echo signal. Therefore, the other is the echo signal of the sensing signal measured in the time frame a few to tens of nanoseconds after the second device measures the sensing signal sent by the first device.

Step 7. The second device calculates the receiving and sending response R(x, y, f), that is, the ratio of the received electric field to the reflected electric field, wherein f is the carrier frequency of the sensing signal. For example: Assuming that the reflection coefficient of the antenna unit (or smart metasurface unit) with coordinates (x, y) on the second device is $\Gamma(x, y)$, you can get $R(x, y, f)=Er(x, y)/Ei(x,y)/\Gamma(x,y)$, wherein the first device may configure the reflection coefficient of the antenna unit of the second device in advance.

Step 8. The second device obtains the 3D image f(x, y, z) of the target through R(x, y, f), and the method may adopt the spatial domain Fourier transformation method.

In some implementation, the second device may also use the two received sensing signals, configuration information, map information, and the like to obtain a 3D image of the target.

Step 9. The second device sends the obtained 3D image of the target to the first device or the network, wherein the network may be a network server or other network devices.

Figure 7:
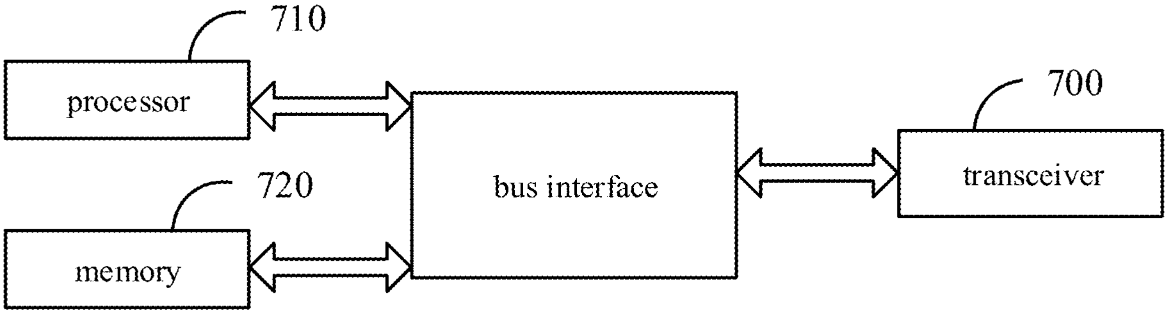
FIG. 7 is a structural diagram of a device provided by an embodiment of the present disclosure.

FIG. 7 is a structural diagram of a device provided by an embodiment of the present disclosure. The device is a first device, as shown in FIG. 7, including a memory 720, a transceiver 700, and a processor 710:

The memory 720 is used to store computer programs; the transceiver 700 is used to send and receive data under the control of the processor 710; the processor 710 is used to read the computer programs in the memory 720 and perform the following operations:

switching a main lobe direction of a transmission beam from a first direction to a second direction, and sending a sensing signal; wherein, the second direction is a direction that the main lobe direction of the transmission beam of the first device is aligned with the second device, the first direction is different from the second direction;

after sending the sensing signal, switching the main lobe direction of the transmission beam from the second direction to the first direction or a third direction, and the third direction is different from the second direction.

Wherein, in FIG. 7, the bus architecture may include any number of interconnected buses and bridges, specifically various circuits of one or more processors represented by the processor 710 and the memory represented by the memory 720 are linked together. The bus architecture can also link together various other circuits such as peripherals, voltage regulators, and power management circuits, etc., which are well known in the art and therefore will not be further described herein. The bus interface provides the interface. Transceiver 700 may be a plurality of elements, including a transmitter and a receiver, providing means for communicating with various other devices over transmission medium, including wireless channels, wired channels, fiber optic cables, etc. For different UEs, the user interface 730 may also be an interface capable of connecting externally and internally to required equipment, and the connected equipment includes but not limited to a keypad, a display, a speaker, a microphone, a joystick, and the like.

The processor 710 is responsible for managing the bus architecture and general processing, and the memory 720 may store data used by the processor 700 when performing operations.

Optionally, the processor 710 may be a central processor (CPU), Application Specific Integrated Circuit (ASIC), Field-Programmable Gate Array (FPGA), or Complex Programmable Logic Device (CPLD), the processor can also adopt a multi-core architecture.

The processor is used to execute any one of the methods provided by the embodiments of the present disclosure according to the obtained executable instructions by calling the computer program stored in the memory. The processor and memory may also be physically separated.

Optionally, when the main lobe direction of the transmission beam is the second direction, the received signal strength of the second device is higher than a received signal strength of the second device in at least one first state, the main lobe direction of the transmission beam of the second device in the first state is a direction other than the second direction, and the received signal strength of the second device is the received signal strength of the second device with respect to the first device.

Optionally, when the main lobe direction of the transmission beam is the first direction or the third direction, the received signal strength of the second device is lower than the received signal strength of the second device in at least one second state, the main lobe direction of the transmission beam of the second device in the second state is a direction other than the first direction or the third direction, and the received signal strength of the second device is the received signal strength of the second device with respect to the first device.

Optionally, the second device includes:

A target or a reflective device;

Wherein the reflective device has an ability to reflect a signal and an ability to receive a signal.

Optionally, the processor 710 is also used for:

Sending, by the first device, configuration information to the second device, wherein the configuration information includes at least one of the following:

a transmission resource location of the sensing signal, waveform information of the sensing signal, configuration information of the second device, configuration information for the second device to feedback sensing information.

It should be noted here that the above-mentioned device provided by the embodiments of the present disclosure can realize all the method steps realized by the method embodiments, and can achieve the same technical effect. The same part and the beneficial effect will not be described in detail.

Figure 8:
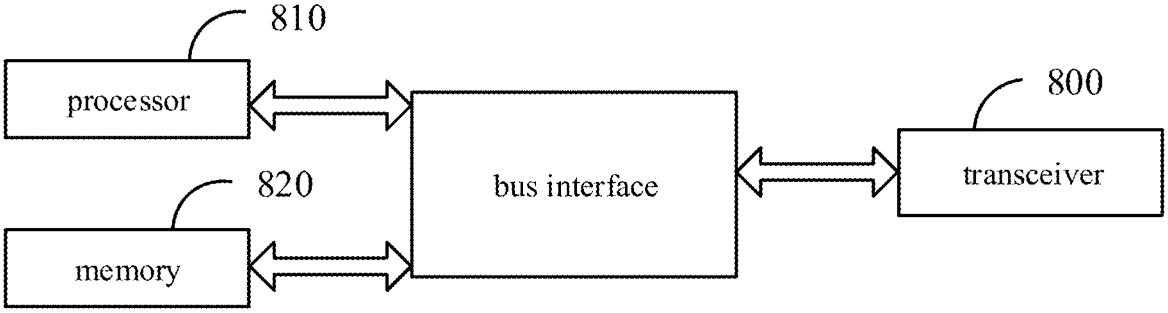
FIG. 8 is another structural diagram of a device according to an embodiment of the present disclosure.

FIG. 8 is a structural diagram of a device provided by an embodiment of the present disclosure. The device is a second device. As shown in FIG. 8, it includes a memory 820, a transceiver 800, and a processor 810:

The memory 820 is used to store computer programs; the transceiver 800 is used to send and receive data under the control of the processor 810; the processor 810 is used to read the computer programs in the memory 820 and perform the following operations:

receiving a sensing signal sent by a first device;

Wherein, the sensing signal is a sensing signal sent by the first device by switching the main lobe direction of the transmission beam from a first direction to a second direction; wherein, the second direction is a direction that the main lobe direction of the transmission beam of the first device is aligned with the second device, the first direction is different from the second direction.

Wherein, in FIG. 8, the bus architecture may include any number of interconnected buses and bridges, specifically various circuits of one or more processors represented by the processor 810 and the memory represented by the memory 820 are linked together. The bus architecture can also link together various other circuits such as peripherals, voltage regulators, and power management circuits, etc., which are well known in the art and therefore will not be further described herein. The bus interface provides the interface. Transceiver 800 may be a plurality of elements, including a transmitter and a receiver, providing means for communicating with various other devices over transmission medium, including wireless channels, wired channels, fiber optic cables, etc. For different UEs, the user interface 830 may also be an interface capable of connecting externally and internally to required device, and the connected device includes but not limited to a keypad, a display, a speaker, a microphone, a joystick, and the like.

The processor 810 is responsible for managing the bus architecture and general processing, and the memory 820 can store data used by the processor 800 when performing operations.

Optionally, the processor 810 may be a CPU, ASIC, FPGA or CPLD, the processor can also adopt a multi-core architecture.

The processor is used to execute any one of the methods provided by the embodiments of the present disclosure according to the obtained executable instructions by calling the computer program stored in the memory. The processor and memory may also be physically separated.

Optionally, the processor 810 is also used for:

Reflecting, by the second device, the sensing signal;

Receiving, by the second device, an echo signal generated by a target;

Detecting, by the second device, the target according to the sensing signal received by the second device and the echo signal received by the second device.

Optionally, the detecting the target according to the sensing signal received by the second device and the echo signal received by the second device includes:

detecting a position, a size, and an image of the target based on the received sensing signal and the echo signal. In addition, the detecting the target may also be referred to as sensing the target.

Optionally, the detecting the target according to the sensing signal received by the second device, the echo signal received by the second device, and the reflection coefficient of the second device includes:

Calculating a receiving and sending response of the second device according to a first reception variable, a second reception variable, and the reflection coefficient of the second device, and calculating the sensing information of the target based on the receiving and sending response, and detecting the target according to the sensing information of the target;

Wherein, the first reception variable is a reception variable that the second device receives the sensing signal, and the second reception variable is a reception variable that the second device receives the echo signal.

Optionally, the processor 810 is also used for:

Receiving configuration information sent by the first device, wherein the configuration information includes at least one of the following:

a time-frequency resource position of the sensing signal, waveform information of the sensing signal, configuration information of the second device, and configuration information for the second device to feedback the sensing information.

It should be noted here that the device provided by the embodiments of the present disclosure can realize all the method steps realized by the method embodiments, and can achieve the same technical effect. The same part and the beneficial effect are not described in detail.

Figure 9:
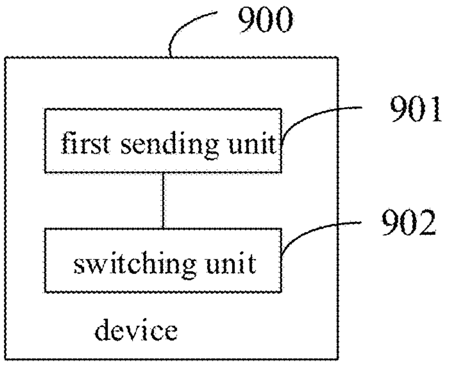
FIG. 9 is yet another structural diagram of a device according to an embodiment of the present disclosure.

FIG. 9 is another structural diagram of a device provided by an embodiment of the present disclosure. The device is a first device. As shown in FIG. 9, a device 900 includes:

a first sending unit 901, configured to switch a main lobe direction of a transmission beam from a first direction to a second direction, and sending a sensing signal; wherein, the second direction is a direction that the main lobe direction of the transmission beam of the first device is aligned with the second device, the first direction is different from the second direction;

A switching unit 902, configured to, after sending the sensing signal, switch the main lobe direction of the transmission beam from the second direction to the first direction or a third direction, and the third direction is different from the second direction.

Optionally, when the main lobe direction of the transmission beam is the second direction, the received signal strength of the second device is higher than a received signal strength of the second device in at least one first state, the main lobe direction of the transmission beam of the second device in the first state is a direction other than the second direction, and the received signal strength of the second device is the received signal strength of the second device with respect to the first device.

Optionally, when the main lobe direction of the transmission beam is the first direction or the third direction, the received signal strength of the second device is lower than the received signal strength of the second device in at least one second state, the main lobe direction of the transmission beam of the second device in the second state is a direction other than the first direction or the third direction, and the received signal strength of the second device is the received signal strength of the second device with respect to the first device.

The second device includes:

A target or a reflective device;

Wherein the reflective device has an ability to reflect a signal and an ability to receive a signal.

Optionally, the device also includes:

A second sending unit, configured to send configuration information to the second device, wherein the configuration information includes at least one of the following:

a transmission resource location of the sensing signal, waveform information of the sensing signal, configuration information of the second device, configuration information for the second device to feedback sensing information.

It should be noted that the device provided by the embodiments of the present disclosure can implement all the method steps implemented by the first device method embodiment, and can achieve the same technical effect. The same parts and beneficial effects of the embodiments are not described in detail.

Figure 10:
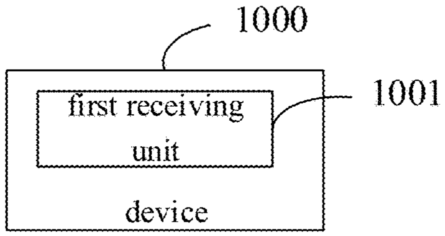
FIG. 10 is still yet another structural diagram of a device according to an embodiment of the present disclosure.

FIG. 10 is another structural diagram of a device provided by an embodiment of the present disclosure. The device is a second device. As shown in FIG. 10, a device 1000 includes:

a first receiving unit 1001 is configured to receive a sensing signal sent by a first device;

Wherein, the sensing signal is a sensing signal sent by the first device by switching the main lobe direction of the transmission beam from a first direction to a second direction; wherein, the second direction is a direction that the main lobe direction of the transmission beam of the first device is aligned with the second device, the first direction is different from the second direction.

Figure 11:
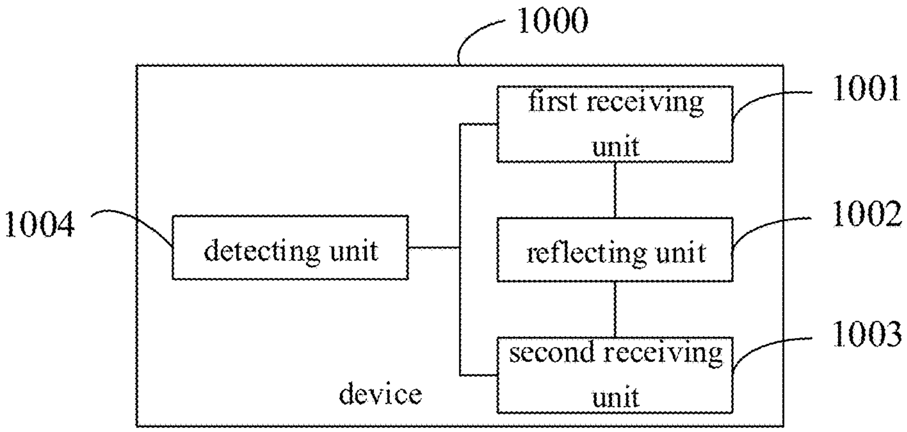
FIG. 11 is still yet another structural diagram of a device according to an embodiment of the present disclosure.

Optionally, as shown in FIG. 11, the device further includes:

a reflecting unit 1002, configured to reflect the sensing signal;

a second receiving unit 1003, configured to receive an echo signal generated by a target;

a detection unit 1004, configured to detect the target according to the sensing signal received by the second device and the echo signal received by the second device.

Optionally, the detecting unit 1004 is configured to detect the target according to the sensing signal received by the second device, the echo signal received by the second device, and the reflection coefficient of the second device.

Optionally, the detection unit 1004 is configured to calculate a receiving and sending response of the second device according to a first reception variable, a second reception variable, and the reflection coefficient of the second device, and calculating the sensing information of the target based on the receiving and sending response, and detecting the target according to the sensing information of the target;

Wherein, the first reception variable is a reception variable that the second device receives the sensing signal, and the second reception variable is a reception variable that the second device receives the echo signal.

Optionally, the device also includes:

A third receiving unit, configured to receive configuration information sent by the first device, wherein the configuration information includes at least one of the following:

a time-frequency resource position of the sensing signal, waveform information of the sensing signal, configuration information of the second device, and configuration information for the second device to feedback the sensing information.

It should be noted here that the device provided by the embodiments of the present disclosure can implement all the method steps implemented by the second device method embodiment, and can achieve the same technical effect. The same parts and beneficial effects of the embodiments are not described in detail.

It should be noted that the division of the units in the embodiment of the present disclosure is schematic, and is only a logical function division, and there may be another division manner in actual implementation. In addition, each functional unit in each embodiment of the present disclosure may be integrated into one processing unit, each unit may exist separately physically, or two or more units may be integrated into one unit. The integrated units can be implemented in the form of hardware or in the form of software functional units.

If the integrated unit is implemented in the form of a software function unit and sold or used as an independent product, it can be stored in a processor-readable storage medium. Based on this understanding, the essence of the technical solution of the present disclosure or the part that contributes to the related art or all or part of the technical solution can be embodied in the form of a software product, and the computer software product is stored in a storage medium. Several instructions are included to make a computer device (which may be a personal computer, a server, or a network device, etc.) or a processor execute all or part of the steps of the methods described in the various embodiments of the present disclosure. The storage medium include: U disk, mobile hard disk, read-only memory (ROM), random access memory (RAM), magnetic disk or optical disk and other media that can store program codes.

The embodiment of the present disclosure also provides a processor-readable storage medium, the processor-readable storage medium stores a computer program, and the computer program is used to enable the processor to execute the signal sending method provided by the embodiment of the present disclosure. Alternatively, the computer program is used to enable the processor to execute the target sensing method provided by the embodiments of the present disclosure.

The processor-readable storage medium can be any available medium or data storage device that can be accessed by a processor, including but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid-state drive (SSD)), etc.

Those skilled in the art should understand that the embodiments of the present disclosure may be provided as methods, systems, or computer program products. Accordingly, the present disclosure may take the form of an entirely hardware embodiment, an entirely software embodiment, or an embodiment combining software and hardware. Furthermore, the present disclosure may take the form of a computer program product embodied on one or more computer-usable storage media (including but not limited to disk storage and optical storage, etc.) having computer-usable program code embodied therein.

Those skilled in the art should understand that embodiments of the present disclosure may be provided as methods, systems, or computer program products. Accordingly, the present disclosure may take the form of a complete hardware embodiment, a complete software embodiment, or a combination of software and hardware embodiments. Further, the present disclosure may take the form of a computer program product implemented on one or more computer-usable storage medium (including but not limited to disk memory and optical memory, etc.) including computer-usable program code.

The present disclosure is described with reference to a flowchart and/or block diagram of a method, apparatus (system), and computer program product according to the embodiments of the present disclosure. It should be understood that each process and/or box in the flowchart and/or block diagram and a combination of processes and/or boxes in the flowchart and/or block diagram can be implemented by computer-executable instructions. These computer executable instructions may be provided to a general-purpose computer, a special-purpose computer, an embedded processor or other programmable data processing device to produce a machine, such that the instructions executed by the processor of a computer or other programmable data processing device to produce a device for achieving the functions specified in one or more processes in the flow chart and/or one or more boxes in the block diagram.

These processor executable instructions may also be stored in the processor readable memory capable of booting a computer or other programmable data processing device to work in a particular manner, such that the instructions stored in the processor-readable memory produce manufactured products comprising an instruction device, the instruction device implements the function specified in one or more processes of the flow chart and/or one box or more boxes in the block diagram.

These processors may execute instructions or may also be loaded into a computer or other programmable data processing device, such that a series of operational steps are performed on a computer or other programmable device to produce computer-implemented processing, so that the instructions executed on a computer or other programmable device provide steps for achieving a function specified in one or more processes of the flowchart and/or one box or more boxes in the block diagram.

Obviously, those skilled in the art may make various modifications and variations of the present disclosure without departing from the spirit and scope of the present disclosure. Thus, if these modifications and variants of the present disclosure fall within the scope of the claims of the present disclosure and their equivalents, the present disclosure is also intended to include these modifications and variants.

What is claimed is:

1. A signal sending method, comprising:

switching, by a first device including a transceiver and a processor coupled to a memory storing computer programs for execution by the processor, a main lobe direction of a transmission beam from a first direction to a second direction, and sending a sensing signal to a second device through the transceiver; wherein, the second direction is a direction that the main lobe direction of the transmission beam of the first device is aligned with the second device, the first direction is different from the second direction;

after sending the sensing signal through the transceiver, switching, by the first device, the main lobe direction of the transmission beam from the second direction to the first direction or a third direction, and the third direction is different from the second direction.

2. The method according to claim 1, wherein when the main lobe direction of the transmission beam is the second direction, a received signal strength of the second device is higher than a received signal strength of the second device in at least one first state, the main lobe direction of the transmission beam of the second device in the first state is a direction other than the second direction, and the received signal strength of the second device is a received signal strength of the second device with respect to the first device.

3. The method according to claim 1, wherein when the main lobe direction of the transmission beam is the first direction or the third direction, the received signal strength of the second device is lower than a received signal strength of the second device in at least one second state, the main lobe direction of the transmission beam of the second device in the second state is a direction other than the first direction or the third direction, and the received signal strength of the second device is the received signal strength of the second device with respect to the first device.

4. The method according to claim 1, wherein the second device comprises:

a target or a reflective device;

wherein the reflective device has an ability to reflect a signal and an ability to receive a signal.

5. The method according to claim 1, further comprising:

sending, by the first device through the transceiver, configuration information to the second device, wherein the configuration information includes at least one of the following:

a transmission resource location of the sensing signal, waveform information of the sensing signal, configuration information of the second device, or configuration information for the second device to feedback sensing information.

6. A non-transitory processor-readable storage medium, wherein the non-transitory processor-readable storage medium stores a computer program, and the computer program is executed by a processor to implement the signal sending method according to claim 1.

7. A target sensing method, comprising:

receiving, by a second device including a transceiver and a processor coupled to a memory storing computer programs for execution by the processor, a sensing signal sent by a first device through the transceiver;

wherein, the sensing signal is a sensing signal sent by the first device by switching a main lobe direction of a transmission beam from a first direction to a second direction; wherein, the second direction is a direction that the main lobe direction of the transmission beam of the first device is aligned with the second device, the first direction is different from the second direction;

wherein the main lobe direction of the transmission beam is switched from the second direction to the first direction or a third direction after the sensing signal is sent to the second device, and the third direction is different from the second direction.

8. The method according to claim 7, further comprising:

reflecting, by the second device, the sensing signal;

receiving, by the second device through the transceiver, an echo signal generated by a target;

detecting, by the second device, the target according to the sensing signal received by the second device and the echo signal received by the second device.

9. The method according to claim 8, wherein the detecting, by the second device, the target according to the sensing signal received by the second device and the echo signal received by the second device, includes:

detecting, by the second device, the target according to the sensing signal received by the second device, the echo signal received by the second device, and a reflection coefficient of the second device.

10. The method according to claim 9, wherein the detecting, by the second device, the target according to the sensing signal received by the second device, the echo signal received by the second device, and a reflection coefficient of the second device, includes:

calculating, by the second device, a receiving and sending response of the second device according to a first reception variable, a second reception variable, and the reflection coefficient of the second device, and calculating the sensing information of the target based on the receiving and sending response, and detecting the target according to the sensing information of the target;

wherein the first reception variable is a reception variable that the second device receives the sensing signal, and the second reception variable is a reception variable that the second device receives the echo signal.

11. The method according to claim 7, further comprising:

receiving, by the second device through the transceiver, configuration information sent by the first device, wherein the configuration information includes at least one of the following:

a time-frequency resource position of the sensing signal, waveform information of the sensing signal, configuration information of the second device, and configuration information for the second device to feedback the sensing information.

12. A device, being a second device, comprising: a memory, a transceiver, and a processor, wherein:

the memory is used to store computer programs; the transceiver is used to send and receive data under the control of the processor; the processor is used to read the computer programs in the memory and perform the target sensing method according to claim 7.

13. The device according to claim 12, wherein the processor is further configured to:

reflect the sensing signal;

receive an echo signal generated by a target;

detect the target according to the sensing signal received by the second device and the echo signal received by the second device.

14. A non-transitory processor-readable storage medium, wherein the non-transitory processor-readable storage medium stores a computer program, and the computer program is executed by a processor to implement the target sensing method according to claim 7.

15. A device, being a first device, comprising: a memory, a transceiver, and a processor, wherein:

the memory is used to store computer programs; the transceiver is used to send and receive data under the control of the processor; the processor is used to read the computer programs in the memory and perform the following operations:

switching a main lobe direction of a transmission beam from a first direction to a second direction, and sending a sensing signal; wherein, the second direction is a direction that the main lobe direction of the transmission beam of the first device is aligned with the second device, the first direction is different from the second direction;

after sending the sensing signal, switching the main lobe direction of the transmission beam from the second direction to the first direction or a third direction, and the third direction is different from the second direction.

16. The device according to claim 15, wherein when the main lobe direction of the transmission beam is the second direction, a received signal strength of the second device is higher than a received signal strength of the second device in at least one first state, the main lobe direction of the transmission beam of the second device in the first state is a direction other than the second direction, and the received signal strength of the second device is a received signal strength of the second device with respect to the first device.

17. The device according to claim 16, wherein when the main lobe direction of the transmission beam is the first direction or the third direction, the received signal strength of the second device is lower than a received signal strength of the second device in at least one second state, the main lobe direction of the transmission beam of the second device in the second state is a direction other than the first direction or the third direction, and the received signal strength of the second device is the received signal strength of the second device with respect to the first device.

* * * * *